3,239,563
REDUCTION OF 1-PHENYL-NITROPROPANE-
1,3-DIOL
William M. Pearlman, Ann Arbor, Mich., assignor to Parke, Davis & Company, Detroit, Mich., a corporation of Michigan
No Drawing. Filed Dec. 13, 1962, Ser. No. 244,257
6 Claims. (Cl. 260—570.6)

The present invention is concerned with a process for the reduction of organic nitro compounds to organic amines. More particularly, it relates to a process for the reduction of 1-phenyl-2-nitropropane-1,3-diol to 1-phenyl-2-aminopropane-1,3-diol.

According to the invention 1-phenyl-2-aminopropane-1,3-diol is produced by reducing 1-phenyl-2-nitropropane-1,3-diol with a noble metal catalyst and formic acid. Some noble metal catalysts suitable for use in the process of the invention are palladium and platinum and their halides and oxides. The noble metal catalyst can be used without a carrier or with a carrier such as carbon, diatomaceous earth or barium sulfate. The formic acid used in the process of the invention is the source of hydrogen for the reduction as well as the source of carbon dioxide formed as a by-product of the process. Theoretically, 3 moles of formic acid are required for each mole of the nitro compound to be reduced. In practice, at least this theoretical amount and preferably an excess of the formic acid is used. The reduction can be carried out in the presence of excess formic acid as the solvent although customarily, for reasons of convenience and economy, one or more additional solvents such as water, a lower alkanol such as methanol or ethanol, an ester such as methyl acetate or ethyl acetate, a glycol such as ethylene glycol or propylene glycol, an ether such as tetrahydrofuran, or an alkanoic acid such as acetic acid are used as a solvent or co-solvent. A solvent which is predominantly water is preferred. The reduction process of the invention proceeds readily at atmospheric pressure and at room temperature and the mild conditions under which it can be carried out constitute one of its principal advantages. Pressures higher than atmospheric pressure can be used but are unnecessary. The process can be carried out in a reaction vessel open to the atmosphere or in a closed reaction vessel. If it is carried out in a closed reaction vessel, there is an increase in pressure as the reaction proceeds due to the formation of carbon dioxide. Temperatures higher than room temperature can also be used, but if it is desired to avoid isomerization, temperatures substantially higher than 50° C. are avoided. Depending somewhat upon catalyst activity, the reduction is usually complete within about 12–24 hours, carbon dioxide being released as the reaction proceeds. The 1-phenyl-2-aminopropane-1,3-diol is usually present in the reaction mixture as an acid-addition salt with formic acid and can be isolated directly in this form, or following conversion to the free base by treatment with a base such as an alkali metal hydroxide or carbonate, or following conversion to another acid-addition salt by anion exchange or by reaction of the free base with an acid. The 1-phenyl-2-nitropropane-1,3-diol employed as starting material can be obtained by the reaction of benzaldehyde and nitroethanol.

1-phenyl-2-nitropropane-1,3-diol and 1-phenyl-2-aminopropane-1,3-diol can exist in diastereoisomeric forms designated as the threo and erythro forms, each of which also exists in optically isomeric or D and L forms. The groups on the two asymmetric carbon atoms of the threo forms have the same relative spatial configuration or arrangement as the groups on the two asymmetric carbon atoms of pseudoephedrine and threose. The groups on the two asymmetric carbon atoms of the erythro forms have the same relative spatial configuration or arrangement as the groups on the two asymmetric carbon atoms of ephedrine and erythrose. The process of the invention is intended for the use of either the threo or erythro nitro compounds as starting materials with the production of the corresponding threo or erythro amino compounds as products.

1-phenyl-2-aminopropane-1,3-diol is a valuable chemical intermediate. It is useful as an intermediate in the synthesis of chloramphenicol. Threo-1-phenyl-2-aminopropane-1,3-diol is the most useful stereoisomer because it has the same configuration as chloramphenicol itself, but the erythro isomer is also a useful intermediate because it can be isomerized to the threo configuration at a subsequent stage in the production of chloramphenicol. The process of the invention is an improvement over existing methods of reducing 1-phenyl-2-nitropropane-1,3-diol to 1-phenyl-2-aminopropane-1,3-diol because it produces the latter compound in high yield at ordinary temperatures without the necessity for carrying out a catalytic hydrogenation under relatively high pressures.

The invention is illustrated by the following examples.

*Example 1*

A mixture of 19.7 g. of DL-threo-1-phenyl-2-nitropropane-1,3-diol, 100 ml. of water, 20 ml. of 97% formic acid, and 1 g. of 20% palladium on carbon catalyst is placed at 25° C. in a closed reaction vessel capable of withstanding moderate pressure and stirred for 18 hours. Within the first hour the temperature rises to about 36° C. and then falls to room temperature. The gauge pressure gradually rises to about 45 pounds per square inch at the end of the 18-hour period. The catalyst is then removed by filtration and the filtrate is concentrated to a small volume, made basic with sodium hydroxide and cooled. The insoluble DL-threo-1-phenyl-2-aminopropane-1,3-diol which separates is collected on a filter and dried; M.P. 89–92° C.

*Example 2*

A mixture of 19.7 g. of DL-threo-1-phenyl-2-nitropropane-1,3-diol, 100 ml. of water, 20 ml. of 97% formic acid and 0.2 g. of platinum oxide catalyst is stirred for 16 hours at 25–30° C. The catalyst is removed by filtration and the filtrate is evaporated to a small volume, made basic with sodium hydroxide and cooled. Crystallization is induced if necessary and the insoluble DL-threo-1-phenyl-2-aminopropane-1,3-diol is collected on a filter and dried.

By the foregoing procedure, with the substitution of an equal weight of DL-erythro-1-phenyl-2-nitropropane-1,3-diol for the DL-threo-1-phenyl-2-nitropropane-1,3-diol, the product obtained is DL-erythro-1-phenyl-2-aminopropane-1,3-diol. Any of the individual optical isomers D-threo, L-threo, D-erythro, and L-erythro can also be used in this procedure.

*Example 3*

A mixture of 19.7 g. of DL-threo-1-phenyl-2-nitropropane-1,3-diol, 500 ml. of water, 500 ml. of ethanol, 200 g. of 90% formic acid, and 5 g. of 5% palladium on carbon catalyst is stirred in a reaction vessel open to the atmosphere for 24 hours or until the evolution of gas has ceased. The catalyst is removed by filtration and the filtrate is evaporated to approximately one-third of its original volume, made basic with potassium carbonate and cooled. The insoluble DL-threo-1-phenyl-2-aminopropane-1,3-diol is collected on a filter, washed with cold water, and dried.

*Example 4*

A mixture of 19.7 g. of DL-threo-1-phenyl-2-nitropropane-1,3-diol, 100 ml. water, 16 g. of 90% formic acid, 6 g. of glacial acetic acid and 1 g. of 20% palladium on carbon catalyst is stirred at room temperature in a reaction vessel open to the atmosphere for 24 hours or until the evolution of gas has ceased. The catalyst is removed by filtration and the filtrate is concentrated under reduced pressure to approximately one-fourth its original volume and then made basic with sodium hydroxide and cooled. The insoluble DL-threo-1-phenyl-2-aminopropane-1,3-diol is collected on a filter, washed with cold water, and dried.

I claim:
1. Process for the production of 1-phenyl-2-aminopropane-1,3-diol which comprises reducing 1-phenyl-2-nitropropane-1,3-diol with a noble metal catalyst and formic acid at atmospheric pressure, at a temperature not substantially higher than 50° C., and in the absence of an external source of hydrogen.
2. Process according to claim 1 wherein the 1-phenyl-2-aminopropane-1,3-diol is produced as the acid-addition salt with formic acid and isolated following conversion to the free base.
3. Process according to claim 1 wherein the 1-phenyl-2-nitropropane-1,3-diol and the 1-phenyl-2-aminopropane-1,3-diol are of the threo form.
4. Process according to claim 1 wherein the noble metal catalyst is a palladium catalyst.
5. Process according to claim 1 wherein the noble metal catalyst is a platinum catalyst.
6. Process according to claim 1 wherein the reduction is carried out in a solvent which is predominantly water.

References Cited by the Examiner

UNITED STATES PATENTS

| 2,418,237 | 4/1947 | Senkus | 260—583 |
| 3,005,854 | 10/1961 | Braun et al. | 260—570.6 X |
| 3,041,377 | 6/1962 | Harast | 260—580 |

OTHER REFERENCES

Mailhe, "Chemical Abstracts," vol. 19, page 2334 (1925).

Mailhe et al.: "Chemical Abstracts," vol. II, page 3240 (1917).

CHARLES B. PARKER, *Primary Examiner.*